United States Patent [19]

Toyono et al.

[11] Patent Number: 5,078,487
[45] Date of Patent: Jan. 7, 1992

[54] PROJECTING APPARATUS

[75] Inventors: Tsutomu Toyono; Masamichi Tateoka; Yoshihiro Takada; Hisashi Fukushima, all of Yokohama, Japan

[73] Assignee: Canon Kabushiki Kaisha, Tokyo, Japan

[21] Appl. No.: 512,012

[22] Filed: Apr. 16, 1990

Related U.S. Application Data

[63] Continuation of Ser. No. 226,523, Aug. 1, 1988, abandoned, which is a continuation of Ser. No. 798,315, Nov. 15, 1985.

[30] Foreign Application Priority Data

Nov. 19, 1984 [JP] Japan .................. 59-243949

[51] Int. Cl.$^5$ .............................................. G03B 27/52
[52] U.S. Cl. ..................................... 353/76; 353/122; 355/55; 355/63; 358/451
[58] Field of Search ............. 353/101, 74, 76, 120, 353/85, DIG. 3, 122; 355/68, 41, 63, 55; 358/287, 285, 214, 451, 496; 350/128

[56] References Cited

U.S. PATENT DOCUMENTS

| | | | |
|---|---|---|---|
| 2,815,696 | 12/1957 | Brownscombe | 353/76 |
| 3,537,791 | 11/1970 | Kessler et al. | 353/101 |
| 3,619,035 | 11/1971 | Hopkins | 350/427 |
| 3,741,622 | 6/1973 | Cox | 350/442 |
| 3,891,314 | 6/1975 | Lakin et al. | 353/101 |
| 3,918,797 | 11/1975 | Takauo | 350/427 |
| 3,941,467 | 3/1976 | Kappany et al. | 353/27 R |
| 4,149,775 | 4/1979 | Blake | 353/101 |
| 4,278,334 | 7/1981 | Maeda | 353/85 |
| 4,309,073 | 1/1982 | Nishimura et al. | 350/128 |
| 4,315,279 | 2/1982 | Kuwayama et al. | 358/44 |
| 4,331,979 | 5/1982 | Bendell | 358/214 |
| 4,366,508 | 12/1982 | Crean et al. | 358/287 |
| 4,371,242 | 2/1983 | Dietrich et al. | 353/101 |
| 4,424,534 | 1/1984 | Nagane | 358/287 |
| 4,443,076 | 4/1984 | Itabashi | 353/101 |
| 4,452,509 | 6/1984 | VanBreemen | 350/128 |
| 4,514,063 | 4/1985 | Wang et al. | 353/101 |
| 4,586,814 | 5/1986 | Tokuhara et al. | 355/55 |
| 4,648,695 | 3/1987 | Mizutani et al. | 353/28 |

FOREIGN PATENT DOCUMENTS

| | | | |
|---|---|---|---|
| 0052819 | 3/1985 | Japan . | |
| 1203128 | 8/1970 | United Kingdom | 353/101 |

Primary Examiner—William A. Cuchlinski, Jr.
Assistant Examiner—William C. Dowling
Attorney, Agent, or Firm—Fitzpatrick, Cella, Harper & Scinto

[57] ABSTRACT

A projecting apparatus comprises support device for supporting an original, a projection optical system for forming the image of the original, an optical element disposed on the image side of the projection optical system to cause a principal light ray having entered from the original through the projection optical system to travel in parallelism to the optic axis of the projection optical system, and control device for varying the imaging magnification of the original by the projection optical system with the spacing between the exit pupil of the projection optical system and the optical element being kept constant.

6 Claims, 2 Drawing Sheets

PROJECTING APPARATUS

This application is a continuation of application Ser. No. 07/226,523 filed Aug. 1, 1988, which was a Continuation of Ser. No. 06/798,315, filed Nov. 15, 1985, both now abandoned.

BACKGROUND AND SUMMARY OF THE INVENTION

This invention relates to an apparatus for projecting an original such as a negative film or a positive film, and in particular to a projecting apparatus which enables an original to be read with the imaging magnification thereof varied, in addition to the ordinary reading of the original in a facsimile apparatus, a copying apparatus or the like.

When an original picture such as a microfilm or a 35 mm film is to be read by an image pickup device such as a CCD and an enlarged image of the original picture is to be formed, it has heretofore been possible to obtain the enlarged image by reading the original picture at one-to-one magnification and electrically interpolating the resulting image signal. According to this method, however, the number of picture elements is small and therefore, the image becomes rough and an image of high accuracy cannot be obtained.

In order to overcome such a disadvantage, the applicant has already proposed in Japanese Laid-open Patent Application No. 52819/1985 an apparatus for forming an enlarged image of an original picture by using a projecting apparatus, and then reading the enlarged image by an image pickup device such as a CCD. FIG. 1 of the accompanying drawings shows this proposed reading apparatus.

In FIG. 1, an original picture 1 such as a film illuminated by an illuminating system, not shown, is enlarged and projected by a projection lens 2. A Fresnel lens 3 is disposed on the plane of the image projected by the projection lens 2. The focus of this Fresnel lens 3 is aligned to the position of the exit pupil of the projection lens 2 and therefore, the light having left the Fresnel lens 3 is made parallel to the optic axis of the projection lens 2 and passes through an original supporting glass plate 4. The light passed through the original supporting glass plate 4 is imaged on a solid state image pickup device 6 by an imaging lens 5. The imaging lens 5 and the solid state image pickup device 6 together constitute a head 7, which may be moved in the direction of arrow 8 to read the entire projected image.

In such a reading apparatus, it is desirable that a reproduced image of a desired size of the original be obtained and accordingly, the projection optical system is required to have various imaging magnifications.

It is an object of the present invention to provide a projecting apparatus in which any variation in the imaging magnification of the reproduced image of an original picture does not affect the characteristic of an optical system for reading the reproduced image.

It is a further object of the present invention to provide a projecting apparatus simply mountable on an apparatus capable of reading the optical image from an original on an original supporting table.

To achieve these objects, the projecting apparatus according to the present invention comprises:
 means for supporting an original picture;
 a projection optical system for forming the image of the original picture;
 an optical element disposed on the image side of said projection optical system to cause a principal light ray having entered from the original picture through the projection optical system to travel in parallel to the optic axis of said projection optical system; and
 control means for varying the imaging magnification of the original picture by said projection optical system with the spacing between the exit pupil of said projection optical system and said optical element being kept constant.

DESCRIPTION OF THE PREFERRED EMBODIMENT

Figure 2:
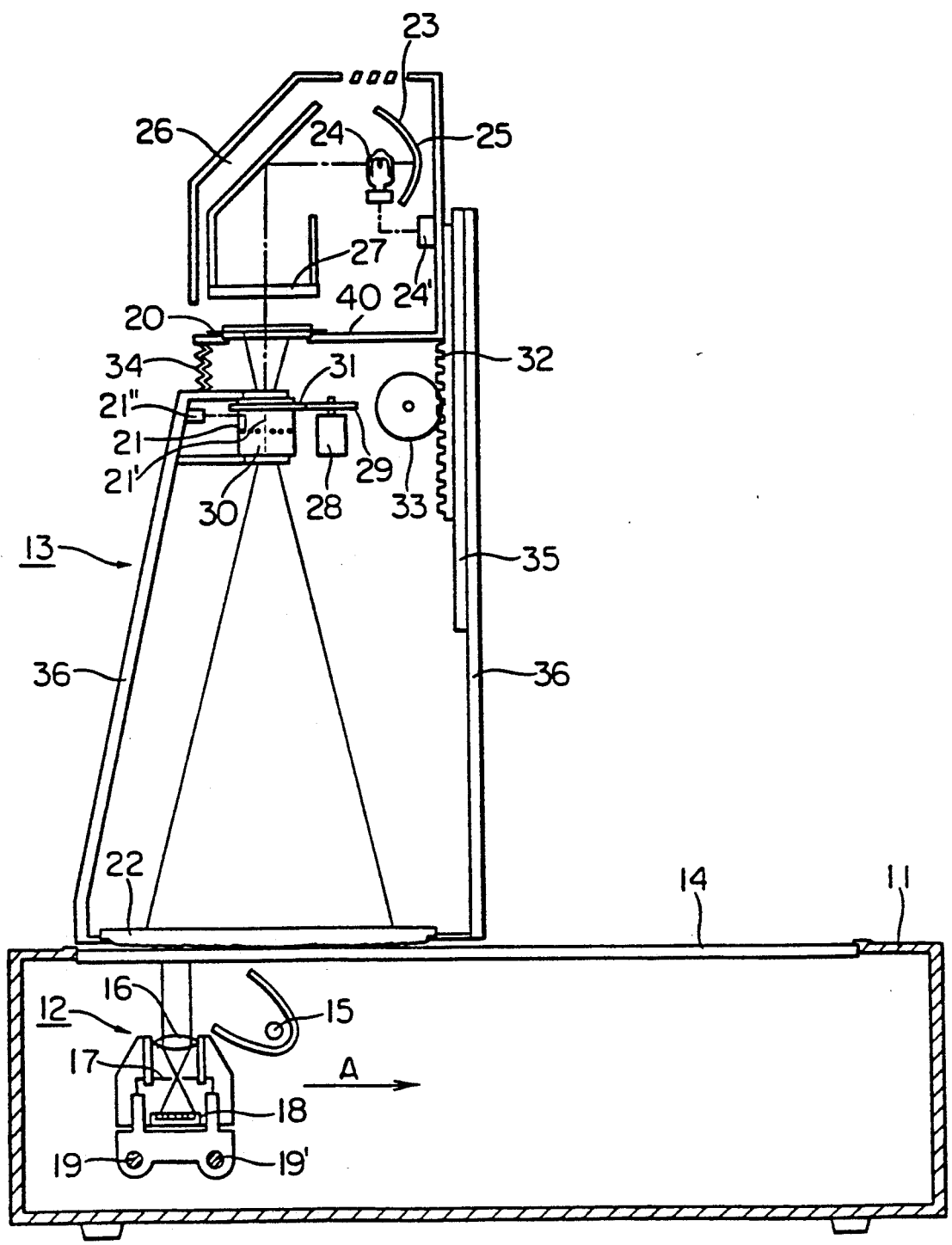
FIG. 2 shows a reading apparatus having mounted thereon an embodiment of the projecting apparatus according to the present invention.

An example in which an embodiment of the projecting apparatus according to the present invention is mounted on a reading apparatus will hereinafter be described with reference to FIG. 2. Reference numeral 11 designates a reading apparatus body containing a reading optical system 12, etc. therein, and reference numeral 13 denotes a projecting apparatus for projecting a photographic film or the like. When a reflective original is to be read by the reading apparatus 11, the projecting apparatus is detached from the reading apparatus, and an original (not shown) is placed on an original supporting table 14 and is illuminated by an illuminating lamp 15. In FIG. 2, description will be made of an example in which a telecentric optical system is used as a reading optical system 12. The principal light ray from the original on the original supporting table 14 travels parallel to the optic axis of an imaging lens 16, passes through a stop 17 lying at the focus position of the imaging lens 16 and reaches a solid state image pickup device 18 such as a CCD. Thus, the optical image of the original is formed on the solid state image pickup device 18. The reading optical system 12 is moved for primary scanning on rails 19 and 19' in a direction perpendicular to the plane of the drawing sheet, and reads the original with a width corresponding to the number of elements of the solid state image pickup device 18. After this reciprocal movement in the primary scanning direction, the reading optical system 12, together with the lamp 15, is moved in the subsidiary scanning direction (the direction of arrow A) by the width read in the one reciprocal movement in the primary scanning direction, and then again starts the next primary scanning. By the primary scanning and the subsidiary scanning being repeated in this manner, the entire area of the original on the original supporting table 14 is read. Description will now be made of a case where the projected image from a film can be read simply by placing the projecting apparatus 13 instead of the reflective original onto the original supporting table 14. Reference numeral 20 designates an original picture having transmittable images thereon, such as a negative film or a positive film, and reference numeral 21 denotes a projecting zoom lens for projecting the original picture 20 while changing the magnification thereof. Reference numeral 22 designates a Fresnel lens as a field lens. The relation between the optical systems of the projecting apparatus 13 and the reading apparatus will now be described with reference to FIG. 3.

Figure 1:
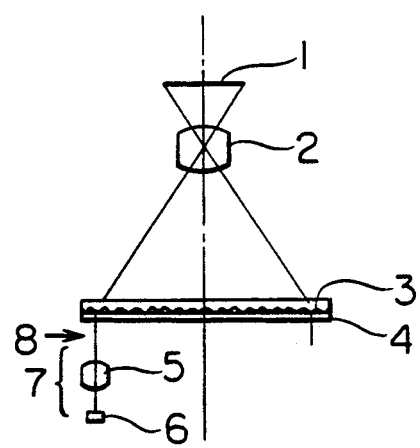
FIG. 1 shows a reading apparatus already proposed by the applicant.
Figure 3:
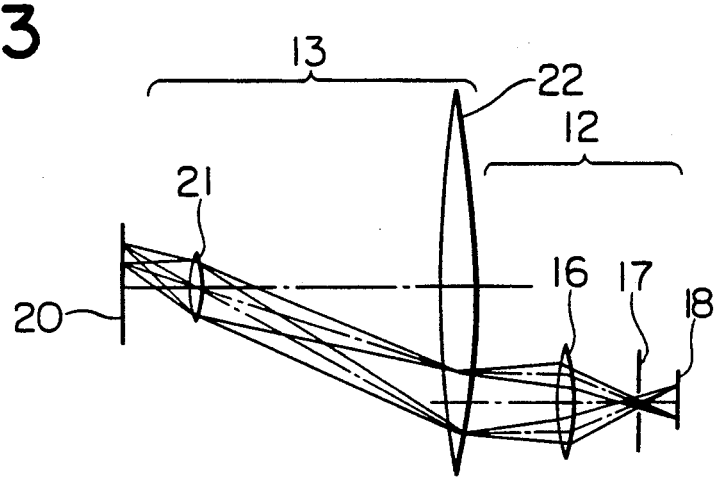
FIGS. 3 and 4 are for illustrating the projecting apparatus according to the present invention.

In FIG. 3, the portion constituted by the projection lens 21 and the field lens 22 is the optical system of the projecting apparatus 13, and the portion constituted by the imaging lens 16, the stop 17 and the solid state image pickup device 18 is the reading optical system 12. The field lens 22 lies near the imaging position of the projection lens 21, and moreover has its focus in the exit pupil of the projection lens 21. If such a construction is adopted, the principal light rays of the optical image from the original picture 20 are enlarged through the projection lens 21 as indicated by dot and-dash lines, are caused to travel in a direction perpendicular to the original supporting table 14, i.e., in parallelism to the optic axis of the imaging lens 16, by the field lens 22, and enter the imaging lens 16. In this manner, these principal light rays, together with the light beam in the vicinity thereof, are converged and imaged on the solid state image pickup device 18 through the stop 17 lying at the focus position of the lens 16.

Figure 4:
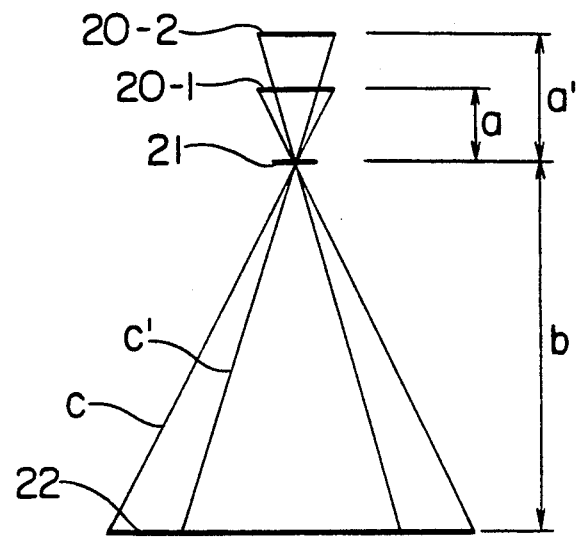

The projecting apparatus of the present invention can make the magnification of the projected image variable, and the relation diagram thereof is shown in FIG. 4. In FIG. 4, reference numerals 20-1 and 20-2 designate the positions of the film surface which is the original picture corresponding to the changed magnifications, reference numeral 21 denotes the projecting zoom lens, and reference numeral 22 designates the field lens. The field lens 22 has its focus at the position of the exit pupil of the projecting zoom lens 21 and therefore, the spacing b between the exit pupil and the field lens 22 is constant. Also, the projecting zoom lens 21 varies the focal length f to $$f = \frac{b}{n+1} \left( \text{derived from } \frac{b}{a} = n \text{ and } \frac{1}{a} + \frac{1}{b} = \frac{1}{f} \right)$$

in accordance with the changed magnification n while keeping the exit pupil position at the focus position of the field lens 22. At this time, the spacing a between the film surface 20-1 and the projecting zoom lens 21 is changed to $$a = \frac{b}{n}.$$

With such a construction, a projected light C is obtained when the changed magnification $$n = \frac{a}{b}$$

and a projected light C' is obtained when the changed magnification $$n' = \frac{a'}{b}.$$

Depending on the design of the zoom lens 21, a magnification change can be accomplished while the relative position of the original picture 20 to the image of the original picture is kept fixed AND the position of the exit pupil is kept fixed.

That is, in order that a magnification change may be accomplished while the position of the exit pupil of the projection optical system such as the projecting zoom lens 21 and the position of the image of the original picture 20 are kept fixed, the combination of the position of a stop 21' (FIG. 2) in the projection optical system and the spacing between the original picture 20 and the projection optical system is suitably varied. As the control means for this purpose, there are the control device 21" of the stop 21' and a device which will hereinafter be described with reference to FIG. 2.

Turning back to FIG. 2, an embodiment of the present invention will hereinafter be described in greater detail.

Reference numeral 23 designates an illuminating light source disposed rearwardly of the original picture 20, reference numeral 24 denotes an illuminating lamp, reference numeral 25 designates a reflector, reference numeral 26 denotes a light diffusing and reflecting plate, and reference numeral 27 designates a diffusing and transmitting plate for diffusing the light from the illuminating lamp 24 and the reflector 25 and for rendering uniform the distribution of light onto the film surface. The focal length of the projecting zoom lens 21 is varied by rotating a gear 31 mounted on a lens moving barrel 30, by the revolution of a motor 28 through a gear 29. Reference numeral 32 designates a rack for moving a film supporting bed 40 and the illuminating light source 23 at a time. This rack 32 is moved up and down by a pinion 33 rotated by a motor (not shown) involving at the same time as the revolution of the motor 28 for the zoom lens in accordance with a changed magnification, thereby varying the spacing between the projection lens 21 and the original picture 20 in accordance with the changed magnification. Reference numeral 34 denotes light-intercepting bellows, and reference numeral 36 designates the housing of the projecting apparatus for supporting a rail 35 on which the rack 32 slides, the projecting zoom lens moving barrel 30, the motor 28, etc. and intercepting the extraneous light. For the fluctuation of the quantity of light during the magnification change of the zoom-lens 21, the quantity of light on the imaging surface (the surface of the field lens 22) can always be made constant by coping with said fluctuation by the variation in the size of the stop 21' in the lens by a control device 21" or the variation in the quantity of light of the lamp 24 by a control device 24'.

The reading signal read from the solid state image pickup device 17 is subjected to suitable signal processing, whereafter it is outputted by an electrophotographic type laser beam printer, an ink jet printer, a thermosensitive printer or the like and is made into a hard copy, or is displayed by a display device such as a cathode ray tube or a liquid crystal display plate or is transmitted. In the present invention, an in-plane index distribution type planar lens of the same construction as an arrangement in which a number of minute lenses are arranged in the form of a matrix array may be used instead of the Fresnel lens. In the foregoing description, the scanning optical system has been two-dimensionally moved and scanned, but alternatively, the original picture or the original supporting table may be one-dimensionally moved in one of the subsidiary scanning direction and the primary scanning direction and the scanning optical system may be one-dimensionally moved in the other scanning direction, whereby the original picture or the like may be read.

Also, a full-color original may be read as by disposing three rows of solid state image pickup device in the primary scanning direction and providing a three-color resolving filter and color image signals may be put out. In this case, for the correction of the colors of a negative film, a color correcting film may be provided in a portion of the optical path of the projecting apparatus as required.

As described above in detail, the present invention can read the images of the original and the original picture faithfully to these images and therefore, when these images are reproduced, there can be formed a beautiful image free of strain.

Further, any changed magnification can be freely selected from an original of a small size and a projected picture of a large format can be obtained and therefore, an image of high accuracy can be formed.

What we claim is:

1. An image information processing apparatus comprising:
    means for supporting an original;
    a projection optical system for forming a magnified image of the original and having an image side and an exit pupil;
    an optical element disposed on the image side of said projection optical system to cause principal rays having entered from the original through said projection optical system to travel parallel to an optical axis of said projection optical system;
    an imaging optical system, having an optical axis, disposed on the emitting side of said optical element so as to image an image of the original having entered through said optical element, wherein said imaging optical system is a telecentric optical system, and the principal rays between said optical element and said imaging optical system are parallel with the optical axis of said optical system;
    reading means for reading the image of the original imaged by said imaging optical system; and
    processing means for processing the reading signal read by said reading means, wherein
    said projection optical system varies the magnification of the image of the original while maintaining a constant spacing between the exit pupil of the projection optical system and said optical element.

2. A projecting-reading apparatus comprising:
    means for supporting an original;
    a projection optical system for forming a magnified image of the original and having an image side and an exit pupil;
    an optical element disposed on the image side of said projection optical system to cause principal rays having entered from the original through said projection optical system to travel parallel to the optical axis of said projection optical system;
    an imaging optical system, having an optical axis, disposed on the emitting side of said optical element so as to image an image of the original having entered through said optical element, wherein said imaging optical system is a telecentric optical system, and the principal rays between said optical element and said imaging optical system are parallel with the optical axis of said imaging optical system; and
    reading means for reading the image of the original imaged by said imaging optical system, wherein said projection optical system varies the magnification of image of the original while maintaining a constant spacing between the exit pupil of said projection optical system and said optical element.

3. A projecting-reading apparatus comprising:
    means for supporting an original;
    a projection optical system for forming a magnified image of the original and having an image side and an exit pupil;
    an optical element disposed on the image side of said projection optical system and having a focus position coincident with the position of the exit pupil of said projection optical system, said optical element causing principal rays having entered from the original through said projection optical system to travel parallel to the optical axis of said projection optical system;
    an imaging optical system, having an optical axis, disposed on the emitting side of said optical element so as to image an image of the original having entered through said optical element, wherein said imaging optical system is a telecentric optical system and the principal rays between said optical element and said imaging optical system are parallel with the optical axis of said imaging optical system; and
    reading means for reading the image of the original imaged by said imaging optical system.

4. An image information processing apparatus comprising:
    means for supporting an original;
    a projection optical system for forming a magnified image of the original and having an image side and an exit pupil;
    an optical element disposed on the image side of said projection optical system to cause principal rays having entered from the original through said projection optical system to travel parallel to an optical axis of said projection optical system;
    an imaging optical system, having an optical axis, disposed on the emitting side of said optical element so as to image an image of the original having entered through said optical system, wherein said imaging optical system is a telecentric optical system, and the principal rays between said optical element and said imaging optical system are parallel with the optical axis of said imaging optical system;
    reading means for reading the image of the original imaged by said imaging optical system;
    processing means for processing the reading signal read by said reading means; and
    means for outputting a signal processed by said processing means, wherein said projection optical system varies the magnification of image of the original while maintaining a constant spacing between the exit pupil of said projection optical system and said optical element.

5. An image information processing apparatus comprising:
    means for supporting an original;
    a projection optical system for forming a magnified image of the original and having an image side and an exit pupil;
    an optical element disposed on the image side of said projection optical system and having a focus position coincident with the position of the exit pupil of said projection optical system, said optical element causing principal rays having entered from the original through said projection optical system to travel parallel to an optical axis of said projection optical system.

an imaging optical system, having an optical axis, disposed on the emitting side of said optical element so as to image an image of the original having entered through said optical element, wherein said imaging optical system is a telecentric optical system, and the principal rays between said optical element and said imaging optical system are parallel with the optical axis of said imaging optical system;

reading means for reading the image of the original imaged by said imaging optical system; and processing means for processing the reading signal read by said reading means.

6. An image information processing apparatus comprising:

means for supporting an original;

a projection optical system for forming a magnified image of the original and having an image side and an exit pupil;

an optical element disposed on the image side of said projection optical system and having a focus position coincident with the position of the exit pupil of said projection optical system, said optical element causing principal rays having entered from the original through said projection optical system to travel parallel to the optical axis of said projection optical system;

an imaging optical system, having an optical axis, disposed on the emitting side of said optical element so as to image an image of the original having entered through said optical element, wherein said imaging optical system is a telecentric optical system, and the principal rays between said optical element and said imaging optical system are parallel with the optical axis of said imaging optical system;

reading means for reading the image of the original imaged by said imaging optical system;

processing means for processing the reading signal read by said reading means; and means for outputting a signal processed by said processing means.

* * * * *

UNITED STATES PATENT AND TRADEMARK OFFICE
CERTIFICATE OF CORRECTION

PATENT NO. : 5,078,487
DATED : January 7, 1992
INVENTOR(S) : Tsutomu Toyono, et al.

It is certified that error appears in the above-identified patent and that said Letters Patent is hereby corrected as shown below:

Title Page:
[56] REFERENCES CITED:

UNITED STATES PATENT DOCUMENTS, "Takauo" should read --Takano-- and "Kappany et al." should read --Kapany et al.--

COLUMN 4:

Line 27, "a time." should read --the same time.--.
    Line 28, "involving" should read --revolving--.

COLUMN 5:

Line 42, "of the" should read --of said--.
    Line 66, "of image" should read --of the image--.

COLUMN 6:

Line 51, "of image" should read --of the image--.
    Line 68, "system." should read --system;--.

Signed and Sealed this

Seventh Day of September, 1993

Attest:

BRUCE LEHMAN

*Attesting Officer*  *Commissioner of Patents and Trademarks*